UNITED STATES PATENT OFFICE.

WILLIAM E. RICHARDSON, OF EAST ST. LOUIS, ILLINOIS.

PROCESS OF CURING MEAT.

SPECIFICATION forming part of Letters Patent No. 248,793, dated October 25, 1881.

Application filed August 9, 1881. (No specimens.)

*To all whom it may concern:*

Be it known that I, WILLIAM E. RICHARDSON, of East St. Louis, in the county of St. Clair and State of Illinois, have invented a certain new and useful Improved Process of Curing Meat, of which the following is a full, clear, and exact description.

This is a process of curing meat adapted for all seasons, but having special value for summer curing, as it does not require that the meat should be cooled in any degree before putting it into the pickle.

In carrying out my process in the preferred manner the meat is cut up when fresh-killed and the joint or pieces of meat put into a vat, no delay for cooling being required. The vat should be several feet in depth—say six feet, more or less. The vat is filled to the top of the meat with pickle at a temperature of about 28° Fahrenheit. The meat may remain in this pickle for about two hours. Then the pickle is run off and the meat allowed to settle down. The superincumbent weight of the meat (assisted by other weight, if desired) presses the heated juices and pickle from the substance of the meat. The meat is left under this pressure for an hour, more or less, when cold pickle is again run into the vat and run out again in about two hours, as before, and the meat again left under pressure.

The above process of alternate pickling and draining under pressure is carried on until the temperature of the interior of the meat is reduced to about 40° Fahrenheit, or lower. After this the meat may be allowed to remain in pickle for three or four days, when the pickle is drawn off and the meat drained of the juices and pickle under pressure, as before described. This process of alternate immersion and draining is carried on until the meat is fully cured.

I claim that by the described process meat can be cured at all seasons without danger of loss and in about one-half the time required in the usual dry-salting process; also, that the curing will be uniform throughout the piece of meat.

It will be understood that in my process the meat has periodical exposure to the air, and consequently receives the benefits in this respect claimed as an advantage in dry-salting.

I am aware that it is not new to preserve meat by low degrees of temperature; that the process of salting has been conducted in artificially-cooled apartments; that ice has been added to brine in the meat-tanks; that meats have been cured by dripping brine from above, each piece being exposed to the air, and also by causing the pickle to flow in a continuous stream over the meat which is immersed therein; also, by a circulating current of refrigerated pickle, and by brine with alternate vacuum and pressure, the vacuum being produced by the removal of the brine.

I claim as my invention—

The process of curing meat by the described alternate immersion in cold pickle and draining under the superincumbent weight of the meat or other weight added for the expulsion of juices and pickle.

WILLIAM E. RICHARDSON.

Witnesses:
SAML. KNIGHT,
GEO. H. KNIGHT.